US009466186B2

(12) United States Patent
Savage, Jr.

(10) Patent No.: US 9,466,186 B2
(45) Date of Patent: *Oct. 11, 2016

(54) CONDITIONALLY VARIABLE STROBE NOTIFICATION APPLIANCE

(71) Applicant: Tyco Fire & Security GmbH, Neuhausen am Rheinfall (CH)

(72) Inventor: Kenneth E. Savage, Jr., Fitchburg, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,549

(22) Filed: Jul. 25, 2014

(65) Prior Publication Data

US 2014/0333450 A1 Nov. 13, 2014

Related U.S. Application Data

(63) Continuation-in-part of application No. 14/324,816, filed on Jul. 7, 2014, which is a continuation of (Continued)

(51) Int. Cl.
*G08B 5/22* (2006.01)
*G08B 5/38* (2006.01)

(Continued)

(52) U.S. Cl.
CPC ............. *G08B 5/38* (2013.01); *H05B 33/0851* (2013.01); *H05B 37/0218* (2013.01); *Y02B 20/46* (2013.01)

(58) Field of Classification Search
CPC . G08B 5/38; H05B 33/0851; H05B 37/0218
USPC ............. 340/815.45, 331, 332, 691.4, 691.8; 362/276, 800, 802; 315/291
See application file for complete search history.

(56) References Cited

U.S. PATENT DOCUMENTS 4,200,823 A * 4/1980 Keeran ................. H05B 41/34
340/331
5,073,919 A 12/1991 Hagensick
(Continued)

FOREIGN PATENT DOCUMENTS

EP 1622106 A1 2/2006
GB 1437033 5/1976
WO WO 91/06078 A1 5/1991

OTHER PUBLICATIONS

International Search Report and Written Opinion for corresponding International Patent Application No. PCT/US2012/039827 dated Aug. 21, 2012.

(Continued)

*Primary Examiner* — Thomas Mullen
(74) *Attorney, Agent, or Firm* — Brinks Gilson & Lione

(57) ABSTRACT

A strobe notification device that operates based on a sensed environmental condition is disclosed. The strobe notification device includes a programmed candela setting, programmed locally at the strobe notification device or programmed remotely and sent to the strobe notification device. Based on the sensed environmental condition, one or more aspects of the operation of the strobe notification device may be modified to operate the strobe of the strobe notification device at least at the programmed candela settings. For example, the intensity, duration of the pulse, or pulse width modulation of the strobe may be modified, based on the sensed environmental condition, to produce a candela output greater than the programmed candela setting. As another example, the intensity, duration of the pulse, or pulse width modulation of the strobe may be modified, based on the sensed environmental condition, to produce a candela output that is equal to the programmed candela setting.

21 Claims, 10 Drawing Sheets

Related U.S. Application Data application No. 13/160,185, filed on Jun. 14, 2011, now Pat. No. 8,773,276, application No. 14/341,549, which is a continuation-in-part of application No. 14/268,862, filed on May 2, 2014, now Pat. No. 9,053,619, which is a continuation of application No. 13/495,559, filed on Jun. 13, 2012, now Pat. No. 8,760,301.

(51) Int. Cl.
*H05B 33/08* (2006.01)
*H05B 37/02* (2006.01)

(56) References Cited

U.S. PATENT DOCUMENTS

| | | | |
|---|---|---|---|
| 5,559,492 | A | 9/1996 | Stewart et al. |
| 6,400,099 | B1 | 6/2002 | Walker |
| 6,426,697 | B1 | 7/2002 | Capowski et al. |
| 6,483,254 | B2 | 11/2002 | Vo et al. |
| 6,556,132 | B1 * | 4/2003 | Pattok ............... H05B 41/30 340/331 |
| 7,369,037 | B2 | 5/2008 | Piccolo, III et al. |
| 7,456,585 | B2 | 11/2008 | Savage, Jr. et al. |
| 7,474,227 | B2 | 1/2009 | Qualey, III |
| 7,960,963 | B1 | 6/2011 | Zarr |
| 8,760,301 | B2 | 6/2014 | Savage, Jr. |
| 8,773,276 | B2 | 7/2014 | Savage, Jr. |
| 9,053,619 | B2 | 6/2015 | Savage, Jr. |
| 2002/0101189 | A1 | 8/2002 | Vo et al. |
| 2005/0122916 | A1 | 6/2005 | Rubin et al. |
| 2005/0128097 | A1 | 6/2005 | Piccolo, III et al. |
| 2005/0157205 | A1 | 7/2005 | Voss et al. |
| 2005/0219060 | A1 | 10/2005 | Curran et al. |
| 2006/0255705 | A1 | 11/2006 | Young |
| 2007/0035255 | A1 | 2/2007 | Shuster et al. |
| 2007/0262728 | A1 | 11/2007 | Savage et al. |
| 2008/0170181 | A1 | 7/2008 | Schou et al. |
| 2008/0272911 | A1 | 11/2008 | Krippendorf et al. |
| 2009/0072989 | A1 | 3/2009 | Rock et al. |
| 2009/0091466 | A1 | 4/2009 | Sendrowski, Jr. |
| 2009/0261737 | A1 | 10/2009 | Wright et al. |
| 2010/0174345 | A1 | 7/2010 | Ashdown |
| 2010/0207777 | A1 | 8/2010 | Woodford |
| 2011/0133649 | A1 | 6/2011 | Kreiner et al. |
| 2012/0319861 | A1 | 12/2012 | Savage, Jr. |
| 2013/0141245 | A1 * | 6/2013 | Gadonniex ............ G08B 5/38 340/693.3 |
| 2014/0320300 | A1 | 10/2014 | Savage, Jr. |
| 2015/0214842 | A1 * | 7/2015 | Barson ............ H05B 33/0815 340/538.11 |

OTHER PUBLICATIONS

International Search Report and Written Opinion for corresponding International Patent Application No. PCT/US2013/045101 dated Sep. 5, 2013.
"Specification for Obstruction Lighting Equipment," *Advisory Circular*, No. 150/5345-43F U.S. Dept. of Transportation—Federal Aviation Administration, 2006, 32 pages.
Office Action from corresponding U.S. Appl. No. 14/268,862 dated Oct. 16, 2014.
Office Action from corresponding U.S. Appl. No. 13/495,559 dated Oct. 30, 2013.
Office Action from corresponding U.S. Appl. No. 14/324,816 dated May 29, 2015.
Final Office Action from corresponding U.S. Appl. No. 14/324,816 dated Sep. 29, 2015.
Office Action from corresponding U.S. Appl. No. 13/160,185 dated Nov. 4, 2013.
FinalOffice Action from corresponding U.S. Appl. No. 13/160,185 dated Jan. 27, 2014.

* cited by examiner

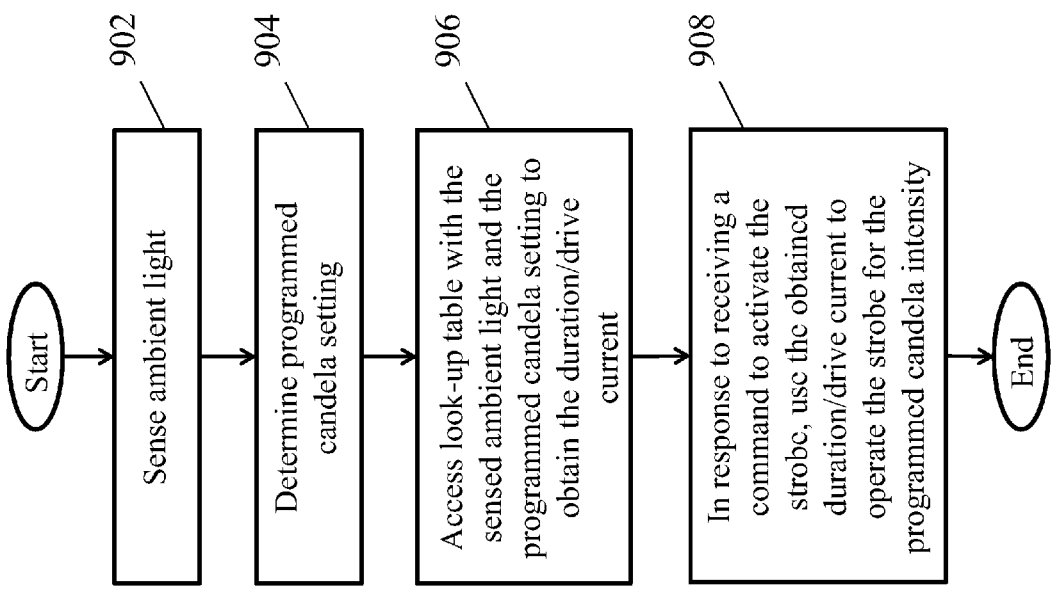

CONDITIONALLY VARIABLE STROBE NOTIFICATION APPLIANCE

REFERENCE TO RELATED APPLICATIONS

This application is a continuation-in-part of U.S. application Ser. No. 14/324,816, which is a continuation of U.S. application Ser. No. 13/160,185 (now U.S. Pat. No. 8,773, 276), and is a continuation-in-part of U.S. application Ser. No. 14/268,862 (now U.S. Pat. No. 9,053,619), which is a continuation of U.S. application Ser. No. 13/495,559 (now U.S. Pat. No. 8,760,301). The entirety of U.S. application Ser. No. 14/324,816, U.S. application Ser. No. 13/160,185 (now U.S. Pat. No. 8,773,276), U.S. application Ser. No. 14/268,862, and U.S. application Ser. No. 13/495,559 (now U.S. Pat. No. 8,760,301) are incorporated by reference herein in their entirety.

BACKGROUND

Fire alarm devices such as audible horns (audible/visible or A/V), loudspeakers (speaker/visible or S/V) and visible strobes (visible only or V/O), are referred to as "notification appliances." Typically, a fire alarm control panel (FACP) drives these devices over one or more "notification appliance circuits" (NACs). The strobes are used, for example, as an alert for the hearing-impaired, or for those in a high noise environment.

One type of strobe uses a flash tube (also called a flash lamp). Typically, the flash tube is an electric glow discharge lamp designed to produce extremely intense, incoherent, full-spectrum white light for very short durations. Flash tubes are made of a length of glass tubing with electrodes at either end and are filled with a gas that, when triggered, ionizes and conducts a high voltage pulse to produce the light. Xenon is an example of the gas that can fill the flash tube, with a Xenon flash tube producing a high-intensity light (such as hundreds of thousands of lumens) for a very short duration pulse (such as hundreds of milliseconds). Xenon flash tubes use a high voltage storage element, such as an electrolytic capacitor, that can be charged several hundred volts to provide energy for the flash. Xenon flash tubes also use a trigger voltage that is in the several thousand volt range to start the gas discharge.

The lifetime of the flash tube can depend on both the energy level used for the lamp in proportion to its discharge energy, and on the pulse duration of the lamp. Failures can be catastrophic or can be gradual, reducing the performance of the lamp below a usable rating.

Another type of strobe is Light Emitting Diode (LED)-based. An LED-based strobe cannot generate light at as high of an intensity as a Xenon-based strobe. Instead, LED-based strobes generate a lower intensity light (such as hundreds of lumens) for a longer period of time (such as tens to hundreds of milliseconds). In this way, the LED-based strobes can generate a comparable amount of light energy, as measured in candela, as a Xenon-based strobe. Further, an LED-based strobe is a semiconductor device that can be run off a lower voltage than a Xenon-based strobe, thus eliminating the high voltage circuitry. A capacitor may still be used for energy storage in the LED-based strobe, albeit for a lower output voltage. Because of its physical characteristics, an LED-based strobe can be turned on either continuously or pulsed. Factors that may limit the light output of the LED-based strobe are junction temperature and luminosity versus current, as determined by the LED chip materials and bonding wires. Finally, in contrast to flash-tube based strobes, LED-based strobes typically have a longer usable lifetime. However, LED-based strobes still lack the extremely intense light output generated by a flash tube based strobe.

SUMMARY

The present embodiments relate to a strobe notification device that includes a strobe element that is operated based on a sensed environmental condition, such as based on ambient light proximate to the strobe notification appliance. In one embodiment, the strobe element for the strobe notification device is an LED-based strobe element.

In one aspect, a strobe notification device for use in an alarm system is disclosed. The strobe notification device comprises: a communication interface; a strobe element; and a controller in communication with the communication interface and the strobe element. The controller is configured to: determine a candela setting programmed for the strobe notification appliance, the programmed candela setting selected from a plurality of available candela settings; receive an indication of an environmental condition; select, based on the indication of the environmental condition, at least one aspect of operation of the strobe element such that the strobe element operates at least at the programmed candela setting; receive, via the communication interface, a command to activate the strobe element; and in response to receiving the command, use the selected at least one aspect in order to control the strobe element to operate the strobe element at least at the programmed candela setting.

Thus, the operation of the strobe may be based on an environmental condition external to the strobe (such as the ambient light proximate to or near the strobe notification device). For example, the strobe notification device may optionally include a sensor to sense the ambient light proximate to the strobe notification device. The sensor may generate an indication of the amount of ambient light and provide this indication as an input to the controller. As another example, the strobe notification appliance may receive the indication of ambient light from an external device, such as a fire alarm control panel. In response to receiving the indication of the amount of ambient light, may select one of the modes of operation in which to operate the LED-based strobe element.

For example, dark ambient research data indicates a higher perceived brightness with longer pulse durations. In bright ambient, the shorter, high intensity pulse may be more noticeable. Given this, in dark ambient, a mode with a longer pulse duration may be a more effective strobe output than a mode with a shorter pulse duration. Moreover, in bright ambient, a mode with a shorter duration and higher intensity may be selected and may be more effective in notifying a building's occupants than a longer pulse duration of lower intensity. Ambient light for a given strobe installation may vary, and can be either bright or dark depending on the time of day or location. The controller may receive the amount indicative of ambient light from a sensor, such as sensing the amount of light in real-time after receipt of the command to generate an output, and select one or more parameters of operation based on the sensed amount of ambient light.

In this regard, it may be beneficial to generate a strobe output with greater contrast than ambient. To that end, in one embodiment, the aspect of operation of the strobe element selected based on the sensed ambient may result in operation of the strobe of the strobe notification appliance to generate an output that is greater than the programmed candela setting. For example, in a strobe notification appliance with a discrete set of available programmed candela settings, such as 15, 30, 70 and 110 candela, a higher candela setting than the programmed candela setting may be selected in order for the output of the strobe to provide a greater contrast than ambient. As another example, the candela setting selected to be greater than ambient may be greater than the programmed candela setting, but not one of the discrete set of available programmed candela settings (such as 18 candela). In another embodiment, the aspect of operation of the strobe element selected based on the sensed ambient may result in operation of the strobe of the strobe notification appliance to generate an output that is equal to the programmed candela setting. For example, any one, any combination, or all of the following may be used to generate a greater contrast than ambient: modification of the duration of the pulse; modification of the intensity of the pulse (such as by modifying the drive current); or modification of the pulse width modulation of the pulse. The strobe light output rating may be determined using the Blondel-Rey equation, which measures the average light energy in candela. So that, different candela ratings may be achieved by varying the second mode pulse duration and/or drive current.

In another aspect, a method for operating a strobe notification device used in an alarm system is disclosed. The method includes: determining a candela setting programmed for the strobe notification appliance, the programmed candela setting selected from a plurality of available candela settings; receiving an indication of an environmental condition; selecting, based on the indication of the environmental condition, at least one aspect of operation of the strobe element such that the strobe element operates at least at the programmed candela setting; receiving, via the communication interface, a command to activate the strobe element; and in response to receiving the command, using the selected at least one aspect in order to control the strobe element to operate the strobe element at least at the programmed candela setting.

In yet another aspect, a strobe notification device for use in an alarm system is disclosed. The strobe notification device comprises: a communication interface; a sensor; a strobe element; and a controller in communication with the communication interface, the sensor, and the strobe element. The controller is configured to: receive, from the sensor, an indication of an environmental condition when the strobe element is generating an output; select, based on the indication of the environmental condition, at least one aspect of operation of the strobe element; receive, via the communication interface, a command to activate the strobe element; and in response to receiving the command, using the selected at least one aspect in order to control the strobe element.

In still another aspect, a method for operating a strobe notification device used in an alarm system is disclosed. The method includes: receiving, from a sensor, an indication of an environmental condition when a strobe element of the strobe notification device is generating an output; selecting, based on the indication of the environmental condition, at least one aspect of operation of the strobe element; receive, via the communication interface, a command to activate the strobe element; and in response to receiving the command, using the selected at least one aspect in order to control the strobe element.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 9 is an exemplary flow chart of modifying the operation of the strobe notification appliance based on the environmental condition such that the output of the strobe notification appliance is equal to the programmed candela setting.

DETAILED DESCRIPTION

Figure 1:
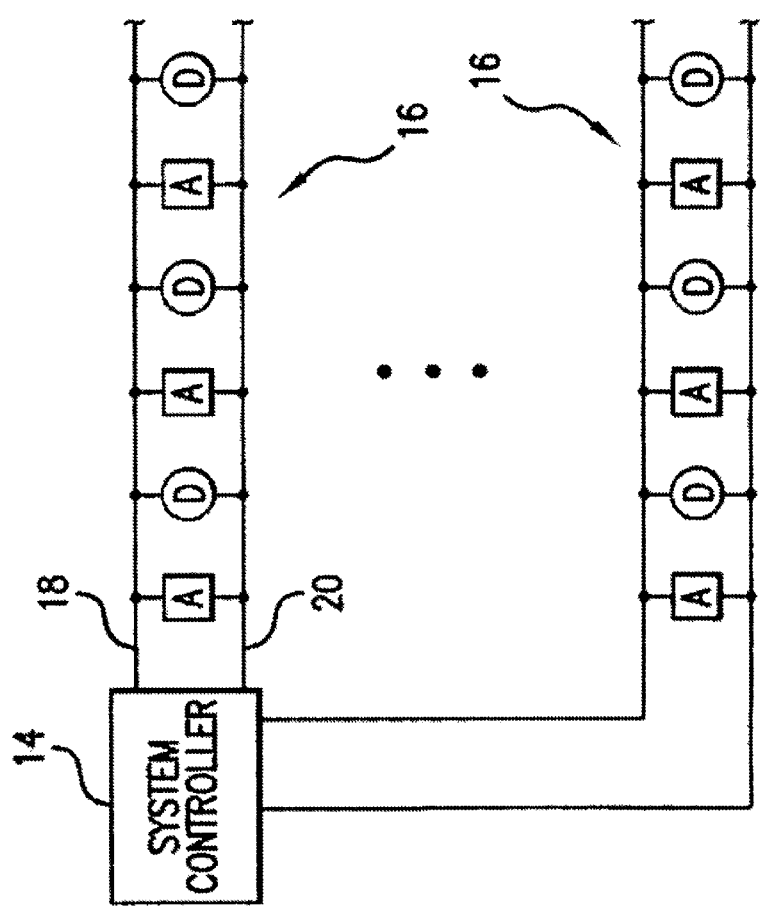
FIG. 1 is a schematic diagram illustrating a fire alarm system.

A system embodying one example of the present invention is illustrated in FIG. 1. The system includes one or more notification appliance circuits (NACs), i.e., networks 16, having alarm condition detectors D and alarm system notification device A. Alternatively, the detectors and notification devices may be on separate networks. A system controller (such as a fire alarm control panel (FACP)) 14 may monitor the detectors D.

The system controller 14 may monitor the alarm condition detectors D. When an alarm condition is sensed, the system controller 14 may signal the alarm to the appropriate notification appliances A through the one or more appliance circuits. Notification devices may include, for example, a visual alarm (such as a strobe), an audible alarm (such as a horn), or a combination thereof.

Although not necessary for carrying out the invention, as shown, all of the notification devices in a network are coupled across a pair of power lines 18 and 20 that advantageously also carry communications between the system controller 14 and the detectors D and notification devices A.

The system controller 14 may comprise a fire alarm control panel and may use one or more commands to signal the alarm to the appropriate notification appliances A. Examples of commands issued for a system with addressable notification appliances are disclosed in U.S. Pat. No. 6,426,697, which is hereby incorporated by reference in its entirety. Alternatively, the communication line to the device may be separate from the power line. In still an alternative embodiment, the system may include non-addressable notification appliances. The communications channel may comprise, for example, a wireless link, a wired link or a fiber optic link.

Further, the system controller 14 may send one or more commands relating to diagnostics, status, or other non-alarm type events. For example the system controller 14 may send a command related to the identification, the configuration, and/or the status of the notification appliances A. Moreover, the notification appliances A may respond in kind One, some, or all of the notification devices A may comprise a strobe device. The strobe device may be an addressable strobe notification device (e.g., the strobe notification device has a uniquely assigned address) or a non-addressable strobe notification device. Further, the strobe device may operate in one of multiple modes, such as a first mode and a second mode. In one embodiment, the first mode is different from the second mode in one or more ways. Examples of differences in the modes include, without limitation: duration of the modes; intensity of the modes; and output wavelength of the modes.

As discussed in more detail below, the fire alarm control panel may send a command to one or more strobe to active the strobe element associated with the strobe.

Figure 2:
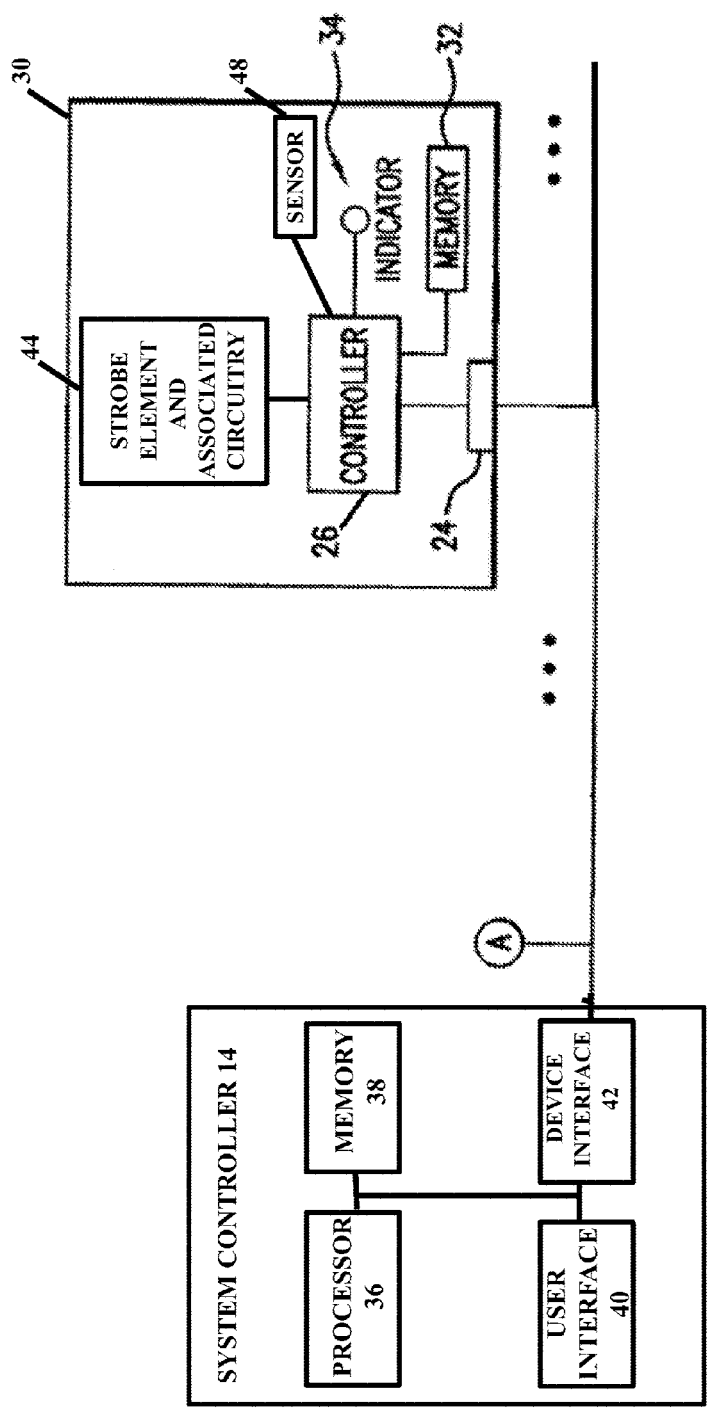
FIG. 2 is a schematic diagram of the system of FIG. 1, further illustrating details of a system controller and a strobe device.

FIG. 2 is a schematic diagram of a part of the system shown in FIG. 1, further illustrating details of the system controller 14 and one of the notification appliances. The system controller 14 includes a processor 36, a memory 38, a user interface 40, and a device interface 42. The processor 36 may comprise a microprocessor, a microcontroller, a digital signal processor, an application specific integrated circuit (ASIC), a field programmable gate array, a logical digital circuit, or other now known or later developed logical processing capability. The processor 36 may work in combination with the memory 38 in order to monitor part or all of the fire alarm system, including one or more of the appliance circuits (such as one or more notification appliance circuits, one or more detector circuits, and/or one or more notification appliance/detector circuits). In addition, the memory may include one or more look-up tables (or other data structures) used for configuration.

User interface 40 may be used by an operator to control configuration and/or operation of the alarm condition detectors D and alarm system notification appliances A. And, device interface 42 may be an example of a communications interface, and may comprise the interface between the system controller 14 and the alarm condition detectors D and alarm system notification appliances A in the one or more appliance circuits.

FIG. 2 further depicts a strobe device 30 in greater detail. The strobe device 30 connects to the network 16 via a network interface (communication connection) 24. The strobe device 30 receives one or more commands from the system controller 14. The controller 26 processes the one or more commands, as discussed in more detail below. Although shown separately, the memory 32 may be integrated with the controller 26.

The strobe device 30 further includes strobe element and associated circuitry 44. In one example, the strobe element is an LED-based strobe element. In one embodiment, the controller 26 determines in which (or both) of first mode or the second mode to operate, and sends commands to activate the strobe element to operate accordingly.

The first mode and the second mode of operation may differ in one or more ways or aspects including without limitation: duration, luminosity, current, and wavelength output. For example, the first mode may have a shorter operation time than the second mode. In particular, the duration for the first mode may be milliseconds and the duration for the second mode may be tens of milliseconds. As another example, the first mode may generate an output with a greater luminosity or light intensity. In particular, the strobe in the first mode may output 1300-1600 lumens for first mode and may output 200-1000 lumens in the second mode. In yet another example, the first mode may use a higher current than the second mode. In particular, in an LED-based strobe element, the first mode may operate with a higher current whereas the second mode may operate with a lower current. In still another example, the first mode may output a different wavelength range than the second mode. In particular, the strobe may output a different color (such as a bluer output) in the first mode than the output in the second mode.

In an LED-based strobe element, the light output from the LED is typically specified with a given luminosity at a rated continuous current. The relationship of luminosity to current may be linear around the rated current, and then may become non-linear as current increases and luminosity falls off as junction temperatures increase. In pulsed operation, the current may be increased to generate more light output than the continuous current rating; however, the device may need to maintain operation within its specifications for junction temperature and care needs to be taken not to drive the device so hard or too long as to damage the chip itself or its internal connections. Further, a notable effect with white LEDs is that they may change their color output (such as to a blue hue) with higher pulsed currents, thus providing an effect similar to a Xenon flash but at a lower intensity. Given this, the first mode (with the higher intensity output) may be used to generate an output with a higher current, but with a shorter duration.

In one aspect, in response to receipt of a command to activate the strobe element, the strobe device 30 is pre-programmed to operate the strobe element in both the first mode and the second mode, such as alternating between operation in the first mode and operation in the second mode. Alternating the operation of the strobe element between different modes (such as the first mode and the second mode) may improve notification in different ambient lighting conditions.

The pre-programming of the strobe device 30 may be performed at manufacture of the strobe device 30 and stored in memory 32. Or, the pre-programming of the strobe device 30 may be performed prior to receipt of the command to activate the strobe device (such as during installation/configuration of the fire alarm system). For example, the system controller 14 may send a configuration command to the strobe device to pre-program the strobe device 30. As another example, a technician may input the configuration command via an input device (not shown), local to the strobe device 30.

In another aspect, the strobe device 30 may determine in which (or both) of the first mode or the second mode to operate. The determination of which mode to operate in may be based on a dynamic or changing condition. One example of a dynamic or changing condition is ambient lighting. The strobe device 30 may optionally receive an indication of the ambient lighting via sensor 48. The sensor 48 may include a photosensor or photodetector that detects light in a predetermined wavelength range, such as the visible light range. As discussed in more detail below, the sensor 48 may sense the amount of ambient light prior to the controller determining in which mode to operate. For example, the sensor 48 may sense the amount of ambient light at predetermined times (such as once per hour) and store a value indicative of the amount of ambient light in memory 32. As another example, the sensor 48 may sense the amount of ambient light in response to the strobe device 30 receiving a command to activate the strobe element. Alternatively, the strobe device 30 does not include a sensor to sense an indication of ambient light.

The controller 26 may receive the amount indicative of ambient light from the sensor 48. The controller 26 may then select one of the modes in which to operate based on the sensed amount of ambient light. In one example, the controller 26 compares the amount indicative of ambient light to a single predetermined level.

If the amount indicative of ambient light is greater than the predetermined amount, the first mode is selected. As discussed above, the first mode has a higher intensity and a shorter duration than the second mode. If the amount indicative of ambient light is less than or equal to the predetermined amount, the second mode is selected. As discussed above, the second mode has a lower intensity and a longer duration than the first mode. Alternatively, the controller may comprise analog circuitry through which the amount indicative of ambient light may be input. The predetermined amount may be set by an input device, such as a switch or a jumper setting, which may be located on the strobe device 30.

In a second example, the controller 26 compares the amount indicative of ambient light to multiple predetermined levels in order to determine which of the first mode and the mode to select. If the amount indicative of ambient light is greater than a first predetermined amount, the first mode is selected. If the amount indicative of ambient light is less than a second predetermined amount, the second mode is selected. If the amount indicative of ambient light is less than the first predetermined amount and greater than the second predetermined amount, both the first mode and the second mode are selected.

In an office environment, the minimum illuminance may be approximately 300 lux. In a home environment (such as a living room), the ambient light level may be a minimum illuminance of 100 lux. The sensor 48 may output a voltage value for a given amount of light. The voltage value may then be sent to a group of discrete level detectors or may be input to an A to D converter. The levels from the sensor may then be used select the appropriate mode. For example, a second mode with a lower intensity flash may used below 100 lux. A combination of both first mode and second mode flashes may be used between 100 and 300 lux. Further, a higher intensity flash (such as used in the first mode) may be used at 300 lux and above.

In some embodiments, an indicator 34, such as a flashing LED (separate from the strobe element and associated circuitry 44), may be used as an output, for example during diagnostic testing, on the strobe device 30. The indicator 34 may be activated, for example, upon command from the system controller 14, upon a local manual command such as a pushbutton (not shown).

After the controller 26 determines in which (or both) of the first mode and the second mode to operate, the controller sends one or more control signals in order to control the operation (including controlling operation of the strobe element to be in the first mode and/or the second mode). One example of an LED-based strobe element is disclosed in U.S. Patent Application No. 2008/0272911, herein incorporated by reference in its entirety.

Figure 3:
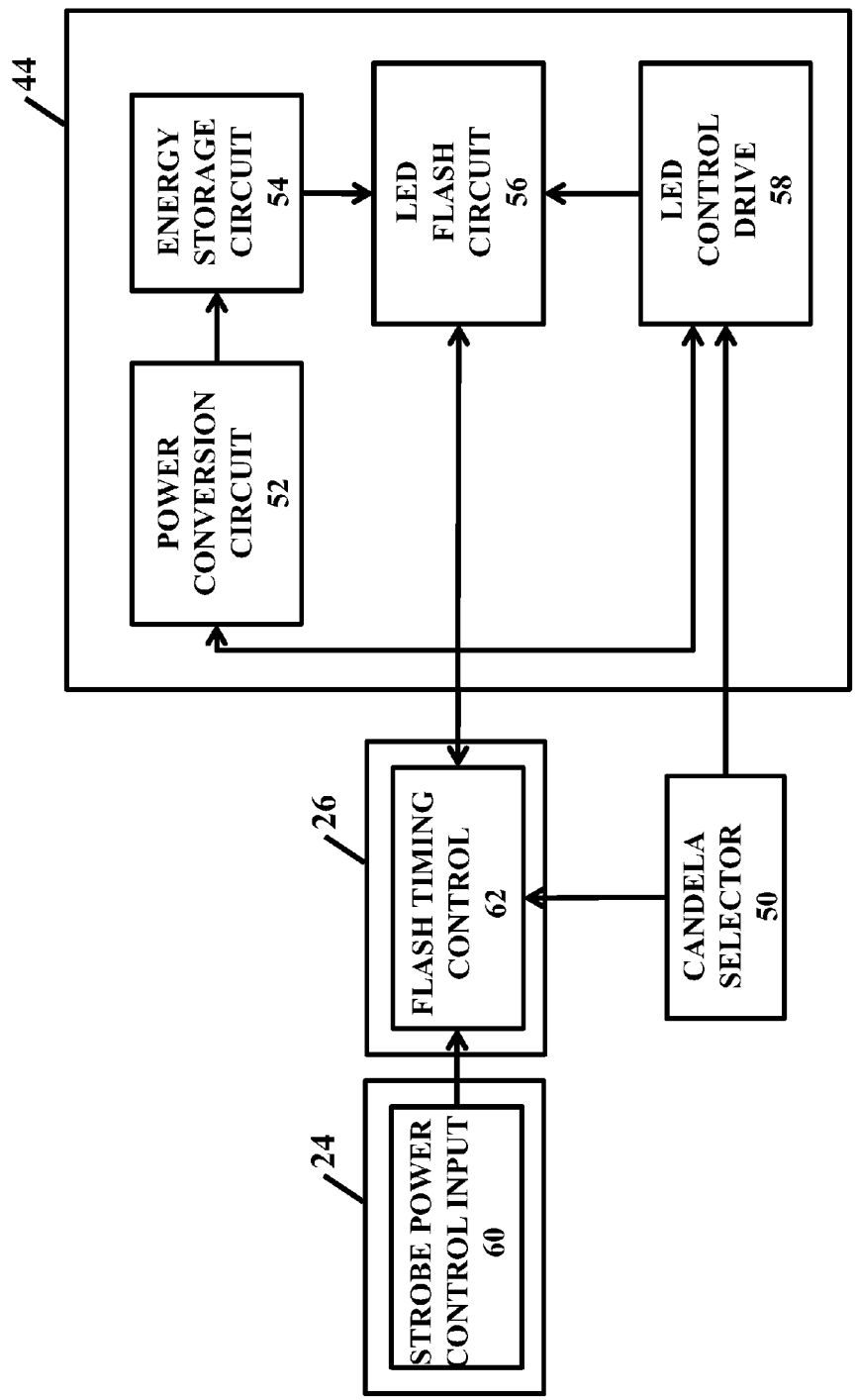
FIG. 3 illustrates one example of an expanded block diagram of the strobe device (including strobe element and associated circuitry) illustrated in FIG. 2.

Referring to FIG. 3, there is shown one example of an expanded block diagram of the strobe device illustrated in FIG. 2. The network interface 24 includes a strobe power control input 60 that receives the command to activate the strobe device 30 and receives power to power the strobe device 30. The strobe power control input 60 sends the received command to the controller 26. The controller 26 includes flash timing control 62, which controls the timing of the flashes of one (or both) of the strobe elements. The flash timing control 62 may receive as an input the candela selector 50, which may be an input device on the strobe device 30 (such as a multi-position switch). An example of the switch is disclosed in U.S. Pat. No. 7,456,585, incorporated by reference herein in its entirety. Examples of candela settings include 15, 30, 75, and 110. Alternatively, the candela setting may be pre-programmed and stored in memory 32. Based on the candela setting, the flash timing control 62 may control the strobe element and associated circuitry 44 to generate an output with the desired candela setting. One example of the strobe element and associated circuitry 44 is illustrated in FIG. 3, including an LED flash circuit 56, a power conversion circuit 52, energy storage circuit 54, and LED control drive 58. The power conversion circuit 52 provides the proper regulated voltage to the energy storage circuit 54. An example of the power conversion circuit 52 may be a voltage regulator (such as a DC-DC converter or current regulator), and an example of the energy storage circuit 54 may be a capacitor. The flash timing control circuit 62 generates an output to the LED control drive 58. Based on the output, the LED control drive 58 provides the proper current to the LED flash circuit 56 in order for the LED flash circuit 56 to generate the desired intensity. Further, the flash timing control 62 generates an output to LED flash circuit 56, which dictates the duration of the output of the LED flash circuit 56. Thus, the flash timing control 62 may control both the intensity and the duration in order to generate an output with the requested candela rating (as dictated by candela selector 50). The flash timing control 62 further may communicate with the power conversion circuit 52 in order for the power conversion circuit 52 to provide the proper voltage to energy storage circuit 54.

Thus, upon receiving the activation signal (such as in the form of a command received by network interface 24), the power conversion circuit 52 may charge up the storage capacitor in energy storage circuit 54. When the strobe element is activated, the flash timing control 62 may initialize the power conversion circuit 52 to charge the energy storage circuit 54, as well as configure the LED control drive 58. This may be applicable to a notification appliance that is addressable. In a non-addressable notification appliance, the flash timing control may be set directly (such as locally on the non-addressable notification appliance). When a flash signal is received, the timing control circuit will generate the first mode and second mode drive current patterns for each flash cycle until the strobe is deactivated (such as shown in FIG. 5).

Figure 4:
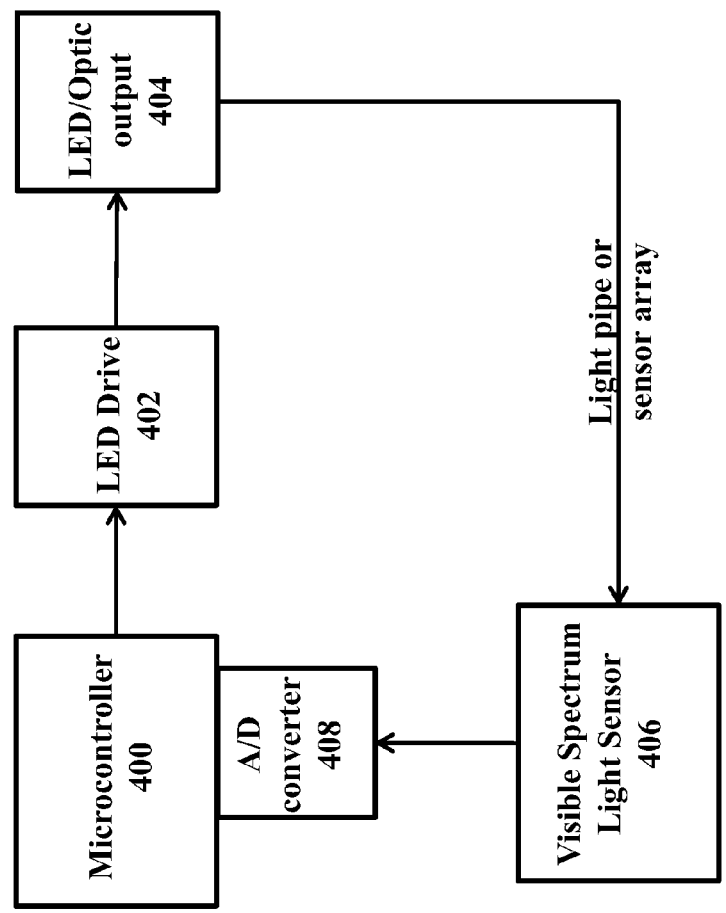
FIG. 4 illustrates another example of an expanded block diagram of the strobe device illustrated in FIG. 2.

FIG. 4 illustrates another example of an expanded block diagram of the strobe device illustrated in FIG. 2. Microcontroller 400 is configured to send one or more signals to control the strobe element. For example, microcontroller 400 sends one or more signals to LED drive 402, which in turn sends signals to LED/Optic output 404. As discussed in more detail below, the light may be sensed in one or more stages of operations of the strobe notification appliance. For example, the light may be sensed when the strobe notification appliance is not generating output, such as when the strobe element is not flashing or when the strobe element is between flashes. In this regard, the sensed light may be the ambient light proximate to the strobe notification device. As another example, the light may be sensed when the strobe notification appliance is generating output, such as when the strobe element is flashing. In one embodiment, the light generated by the strobe element and the ambient light may be guided to a sensor, such as visible spectrum light sensor 406, using a light pipe or a sensor array. The output of the visible spectrum light sensor 406 may be sent to microcontroller 400. In one embodiment, the output of the visible spectrum light sensor 406 may be digitized using A/D converter 408 for input to microcontroller 400. In an alternate embodiment, the output of the visible spectrum light sensor 406 may be digitized prior to output to microcontroller 400.

Figure 5:
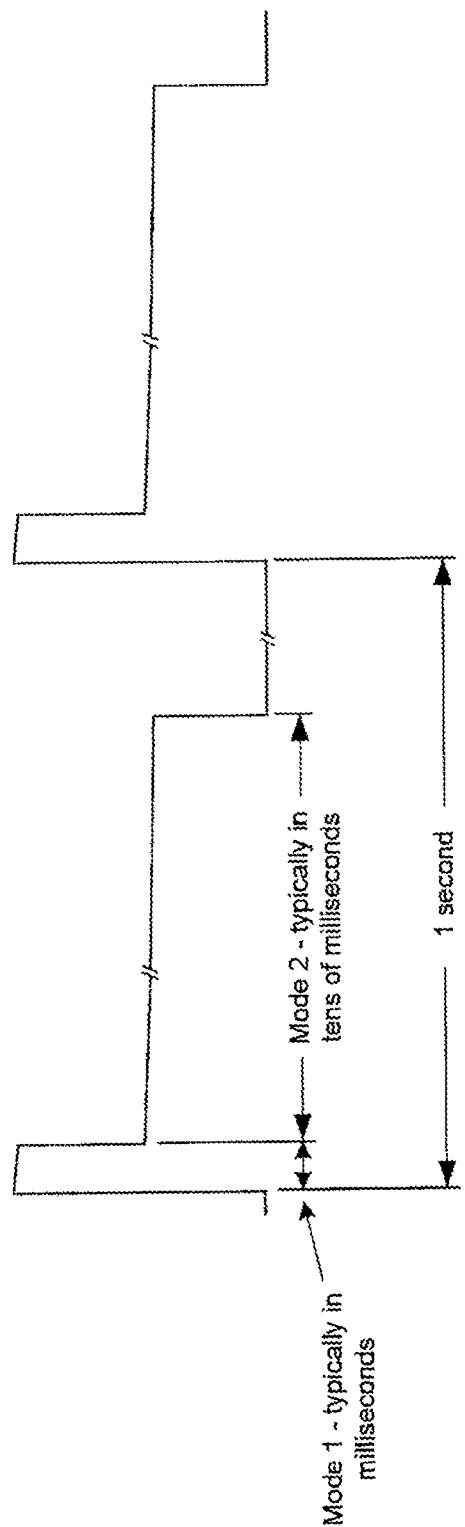
FIG. 5 is an exemplary output of the strobe device, including alternating operation of the strobe device in the first mode and the second mode.

FIG. 5 illustrates an example of the pattern of light output for the strobe device 30. As shown in FIG. 5, the light alternates between a first mode (Mode 1) and a second mode (Mode 2). As shown, the first mode includes a higher luminosity and a shorter duration (on the order of milliseconds). The second mode includes a lower luminosity and a longer duration (on the order of tens of milliseconds). The cycle of the first mode and second mode can repeat, such as every 1 second, as shown in FIG. 5. As shown in FIG. 5, the first mode is followed immediately by the second mode (with no interim period of no luminosity). After the second mode, the LED is turned off, resulting in no luminosity being output by the LED.

Different sequences than that depicted in FIG. 5 may be used. For example, the sequence may be the first mode, followed by no luminosity (no light output by the LED), then followed by the second mode, followed by no luminosity. As another example, the second mode may be immediately followed by the first mode, then followed by no luminosity. As still another example, the second mode may be immediately followed by the first mode, which may be immediately followed by the second mode again, followed by no luminosity. As still another example, the first mode may occur at the start, at the end, or anytime during the second mode. These examples are merely for illustration purposes only. Other sequences are contemplated. Further, the various sequences may be repeated.

Moreover, FIG. 5 depicts two modes (Mode 1 and Mode 2). In an alternative embodiment, more than two modes may be used. For example, three or four modes may be used in a single sequence. Each of the modes may differ from each other in at least one aspect, such as discussed above. Further, the first mode (Mode 1) is depicted as the leading pulse in FIG. 5. Alternatively, the first mode (Mode 1) may occur as a trailing pulse or during the second mode (Mode 2).

Figure 6:
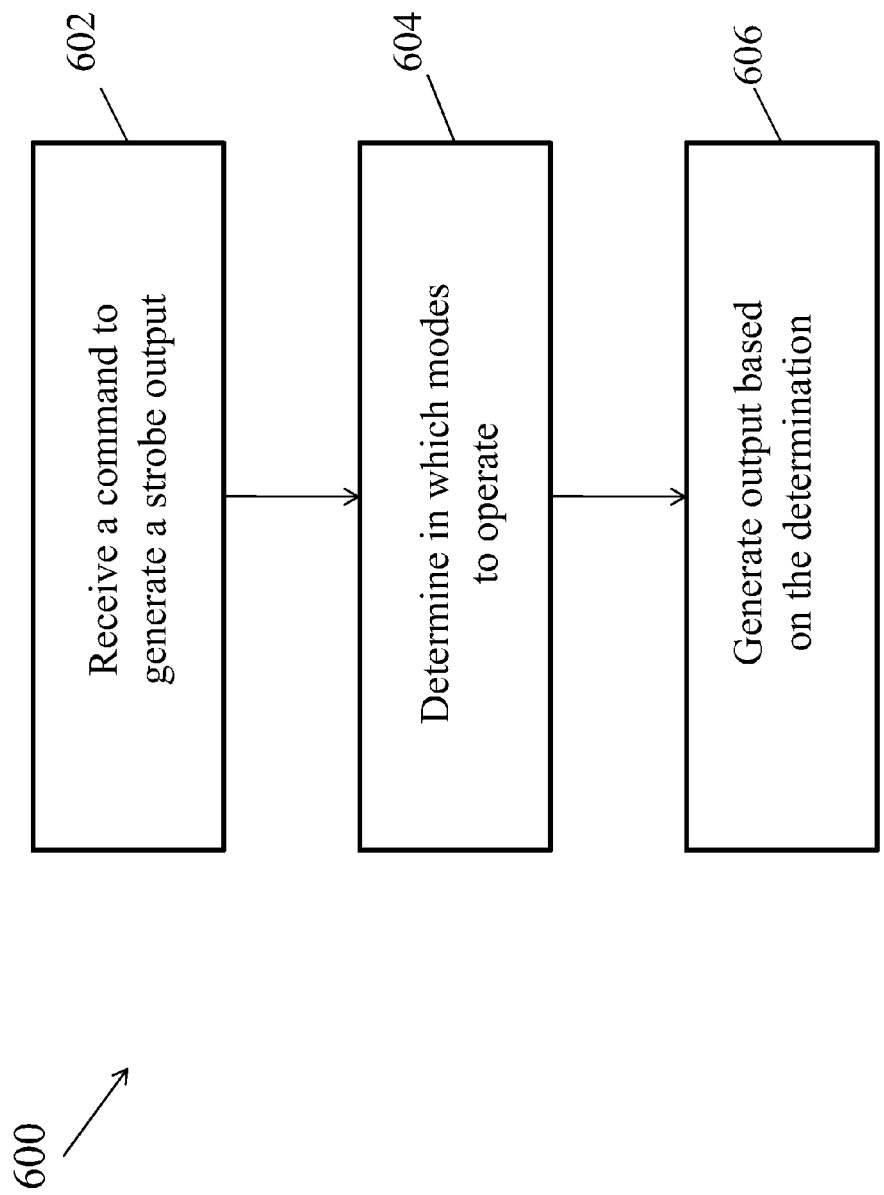
FIG. 6 is an exemplary flow chart of operation of the strobe device.

Referring to FIG. 6, there is illustrated a flow chart 600 for operating the strobe device. At block 602, the strobe device receives a command to generate a strobe output. At block 604, the strobe device determines in which of the modes to operate. As discussed above, the controller 26 may determine whether to operate in the first mode, the second mode, or both the first mode and the second mode. In one embodiment, the strobe device is pre-programmed to operate both in the first mode and in the second mode, so that the determination includes accessing a memory location that stores the pre-programmed pattern of output. In an alternative embodiment, the strobe element receives an indication from an external device (such as the system controller 14) in which (or both) of the modes to operate. The indication may be included in the command to generate the strobe output. The controller of the strobe device may review the command in the strobe device determining in which of the modes to operate. In still another embodiment, the strobe device may obtain a sensor reading, such as a reading of an ambient light level. As discussed in more detail in FIG. 7, the strobe device may determine in which (or both) of the modes to operate based on the sensor reading. As shown at block 606, the strobe device generates the output based on the determination.

Figure 7:
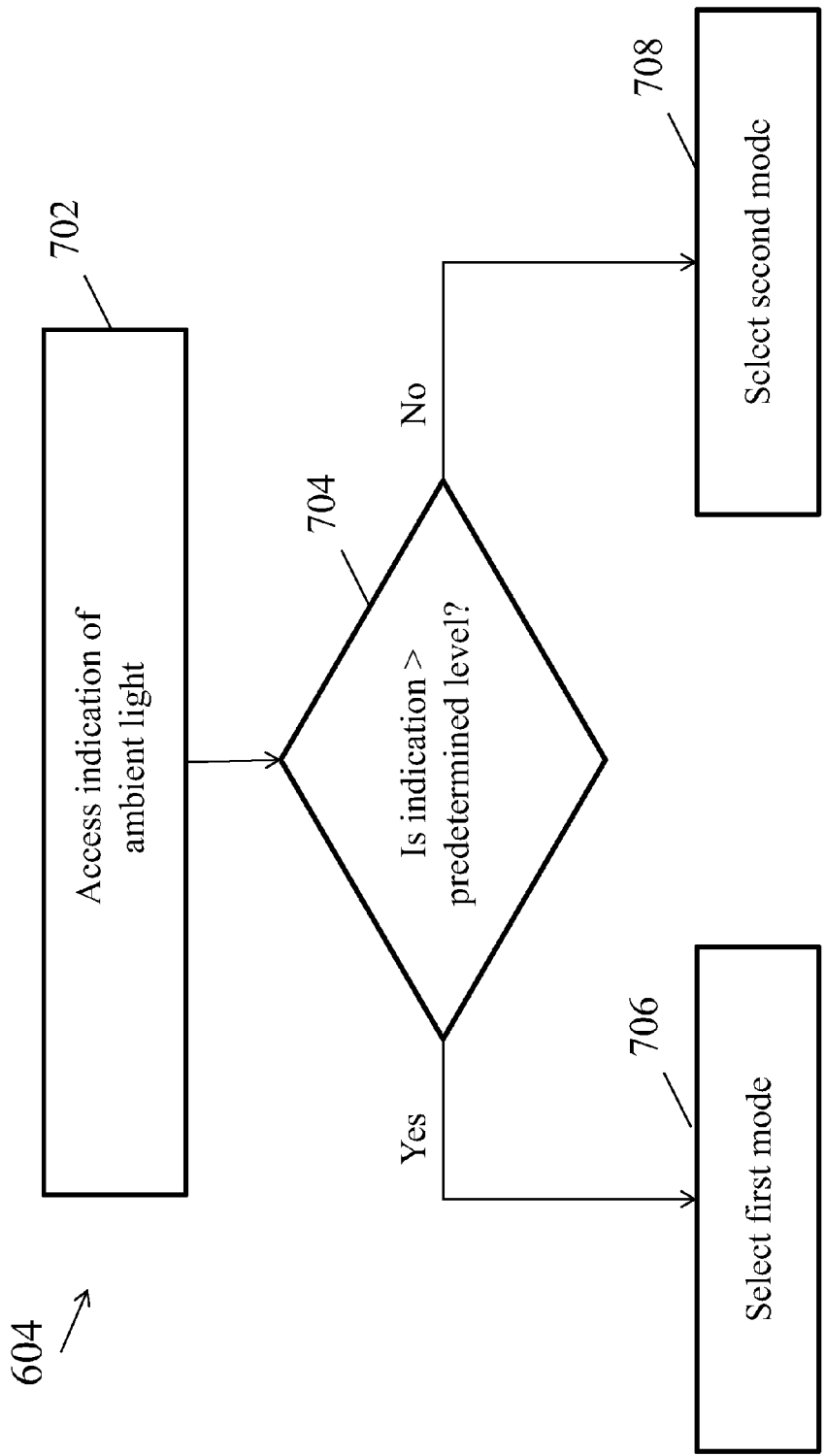
FIG. 7 is an exemplary flow chart of determining in which mode to operate the strobe.

Referring to FIG. 7, there is shown a flow chart of one example of the determination in which modes to operate (block 604 in FIG. 6). At block 702, an indication of the ambient light is accessed. The indication of the ambient light may be stored in a memory, such as memory 32, based on a sensor reading from sensor 48 taken prior to receipt of the command to activate the strobe device. Alternatively, a real-time sensor reading from sensor 48 may be taken in response to receipt of the command to activate the strobe device. The indication of the ambient light is compared to at least one predetermined level, as shown at 704. In one aspect, only a single predetermined level is used (as illustrated in FIG. 7). Alternatively, multiple predetermined levels may be used, as discussed above. If the indication of the amount of ambient light is greater than the predetermined level, the first mode is selected, as shown at 706. If the indication of the amount of ambient light is less than or equal to the predetermined level, the second mode is selected, as shown at 708.

As discussed above, the candela setting may be programmed into the strobe notification appliance in one of several ways. In one embodiment, the candela setting may be programmed locally to the strobe notification appliance. In one example, the strobe notification appliance may have an input device, such as one or more multi-position switches, which may be manually configured by an operator. More specifically, the input device may comprise a single multi-position switch or a plurality of multi-position switches. The different positions of the multi-position switch(es) may be indicative of different candela settings. In this regard, the operator may manually configure the multi-position switch(es) to program the candela setting of the strobe notification appliance. In another example, the strobe notification appliance may have a near-field communication interface that is configured to receive a communication from an operator located proximate to the strobe notification appliance. The communication may indicate the programmed candela setting. Examples of near-field communication protocols include, but are not limited to Bluetooth and Wi-Fi.

In one embodiment, the operation of the strobe notification appliance is modified based on the environmental condition such that the output of the strobe notification appliance is at least at the programmed candela setting. In a first more specific embodiment, the operation of the strobe notification appliance is modified based on the environmental condition such that the output of the strobe notification appliance is at least at, or greater than, the programmed candela setting. As discussed above, the strobe notification appliance may have discrete candela settings from which to select the programmed candela setting. For example, the discrete candela settings may include 15, 30, 70, 110 candela. The programmed candela setting may be selected from the discrete candela settings, such as 15 candela. In operation, the environmental condition may be sensed.

In one embodiment, the sensed environmental condition may comprise ambient light. More specifically, the amount of light may be sensed when the strobe of the strobe notification appliance is on (or active) and when the strobe of the strobe notification appliance is off (such as inactive or in between flashes), and may be compared to one another. As discussed in more detail below, the amount of sensed light when the strobe is on may be compared with the amount of sensed light when the strobe is off. In one example, the comparison may comprise subtracting the amount of sensed light when the strobe is off from the amount of sensed light when the strobe is on. In another example, the comparison may comprise determining a percentage difference between the amount of sensed light when the strobe is on versus the amount of light when the strobe is off.

The comparison may then be analyzed. In one example, the analysis may comprise determining whether the comparison is within a range (such as a required margin, as discussed in more detail below). In response to determining that the comparison is within the range, the current setting of the strobe notification appliance may be maintained. In response to determining that the comparison is outside the range, the current setting of the strobe notification appliance may be modified. In one example, the comparison is less than range. This indicates that the difference between the amount of light output from the strobe when flashing and not flashing is less than desired. In this example, in order to provide better notification of building occupants proximate to the strobe, the light output from the strobe may be increased in order to present a greater contrast to the ambient light. As discussed in more detail below, the amount of light output from the strobe may be modified in one of several ways. In one way, the candela setting of the strobe notification appliance may be increased, thereby selecting an environmental candela setting that is greater than the programmed candela setting. In an example discussed of a programmed candela setting of 15 candela and in which the strobe notification appliance is currently operating at 15 candela, the environmental candela setting may be selected as 30 candela. In another way, the amount of light output from the strobe may be increased to greater than the programmed candela setting (though not equal to one of the discrete candela settings). In the example discussed above in which the programmed candela setting is 15 candela, the strobe may be controlled to increase the light output to be greater than 15 candela, though not increased to a level equal to 30 candela (such as increased to 18 candela).

As discussed in more detail below, increasing the candela setting may be accomplished in one of several ways. In one way, the amount of drive current to the strobe may be increased, thereby increasing the luminosity output from the strobe. In another way, the pulse width modulation (PWM) may be modified. In pulse width modulation, typically, a rate higher than 60 Hz is a sufficient switching rate so that the eye cannot register the flicker. For example, flashing at 1 KHz. The percentage "on" time for the flashing may be modified to increase the candela setting. More specifically, the percentage "on" time, or the duty cycle, may be 10%, 20%, 30% up to 100% of the duration of the light output. In this regard, increasing the light output (and the corresponding candela setting may comprise increasing the duty cycle). In still another way, both the PWM and the amount of drive current may be modified. In particular, keeping the duration of the light output constant (e.g., at 20 mSec), the duty cycle and the drive current may be changed.

In another example, the difference is greater than the range. This indicates that the difference between the amount of light output from the strobe when flashing and not flashing is greater than what may be desired. In this regard, the strobe may be outputting a greater amount of light than what may be considered necessary to alert the building occupants. In this situation, the amount of light the light output from the strobe may be decreased. As discussed in more detail below, the amount of light output from the strobe may be modified in one of several ways. In one way, the candela setting of the strobe notification appliance may be decreased, thereby selecting an environmental candela setting that is less than the current strobe setting, but not less than the programmed candela setting. In an example discussed of a programmed candela setting of 15 candela and in which the strobe notification appliance is currently operating at 30 candela, the environmental candela setting may be selected as 15 candela. In an example discussed of a programmed candela setting of 15 candela and in which the strobe notification appliance is currently operating at 15 candela, the environmental candela setting may remain at 15 candela. In another way, the amount of light output from the strobe may be decreased to less than the programmed candela setting (though not equal to one of the discrete candela settings). In the example discussed above in which the programmed candela setting is 15 candela and in which the strobe notification appliance is currently operating at 30 candela, the strobe may be controlled to decrease the light output to be less than 30 candela, though not less than 15 candela (such as 18 candela).

In a second more specific embodiment, the operation of the strobe notification appliance is modified based on the environmental condition such that the output of the strobe notification appliance is equal to the programmed candela setting. In particular, the candela setting remains at the programmed candela setting; however, at least one aspect of the light output, such as duration/intensity or PWM (such as duty cycle), is modified based on the sensed environmental condition. In one example, in response to determining that the ambient light is greater than a predetermined threshold (such as greater than a first predetermined threshold), the duration of the light output may be decreased and the intensity of the light output may be increased. More specifically, selecting a duration that is ½ the current duration and selecting an intensity that is two times the current intensity (such as by doubling the drive current to the strobe) results in the same candela being output by the strobe, namely the programmed candela setting. In another example, in response to determining that the ambient light is less than a predetermined threshold (such as less than a second predetermined threshold), the duration of the light output may be increased and the intensity of the light output may be decreased. More specifically, selecting a duration that is 2 times the current duration and selecting an intensity that is ½ the current intensity (such as by halving the drive current to the strobe) results in the same candela being output by the strobe, namely the programmed candela setting. In still another example, PWM and the intensity of the light output may be modified. In response to determining that the ambient light is greater than a predetermined threshold (such as greater than the first predetermined threshold), the duty cycle of the PWM may be increased and the intensity of the light output may be decreased (by decreasing the drive current). Also, in response to determining that the ambient light is less than a predetermined threshold (such as less than the second predetermined threshold), the duty cycle of the PWM may be decreased and the intensity of the light output may be increased (by increasing the drive current).

Figure 8A:
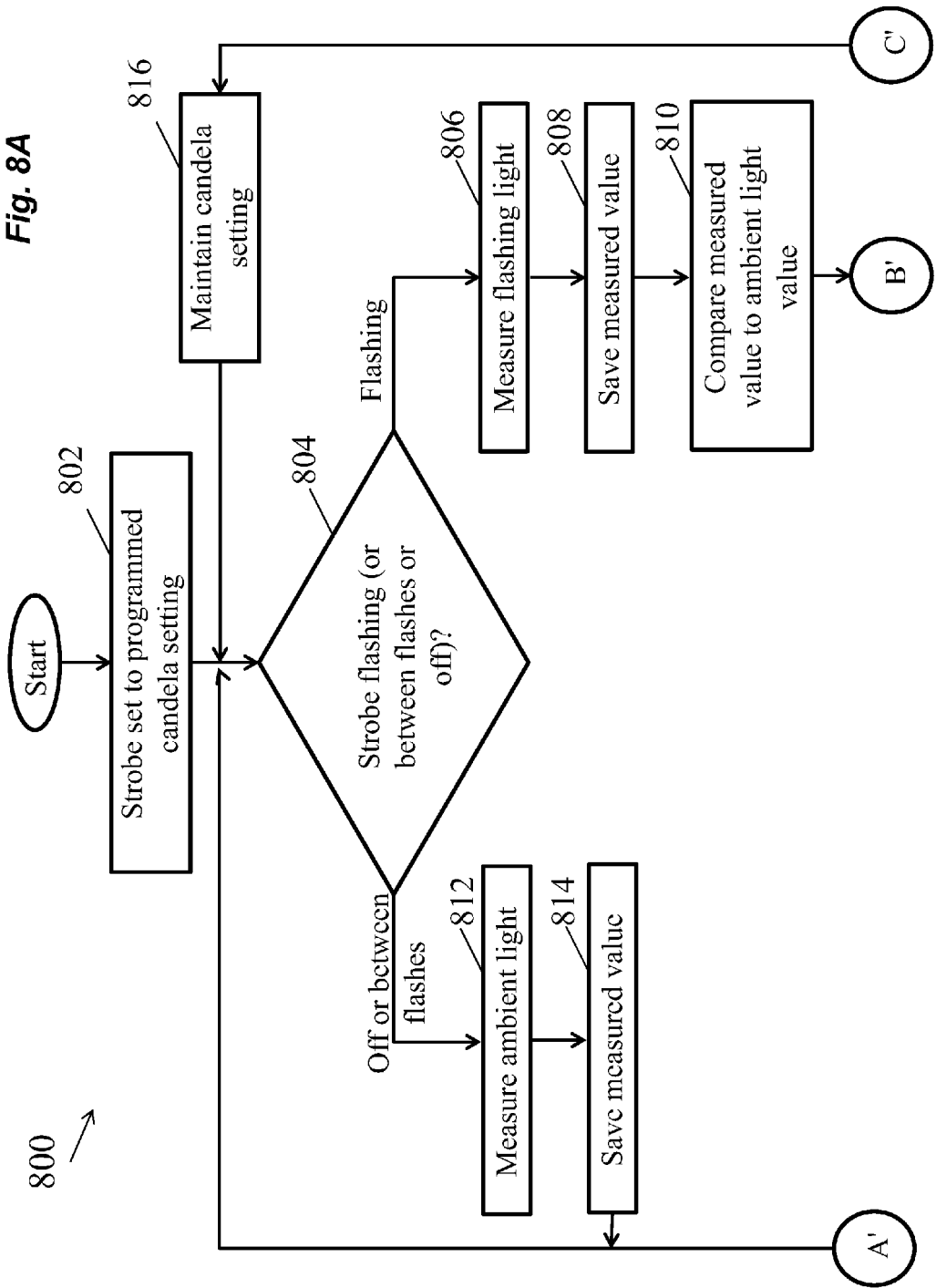
FIGS. 8A-B are an exemplary flow chart of modifying the operation of the strobe notification appliance based on the environmental condition such that the output of the strobe notification appliance is at least at, or greater than, the programmed candela setting.
Figure 8B:
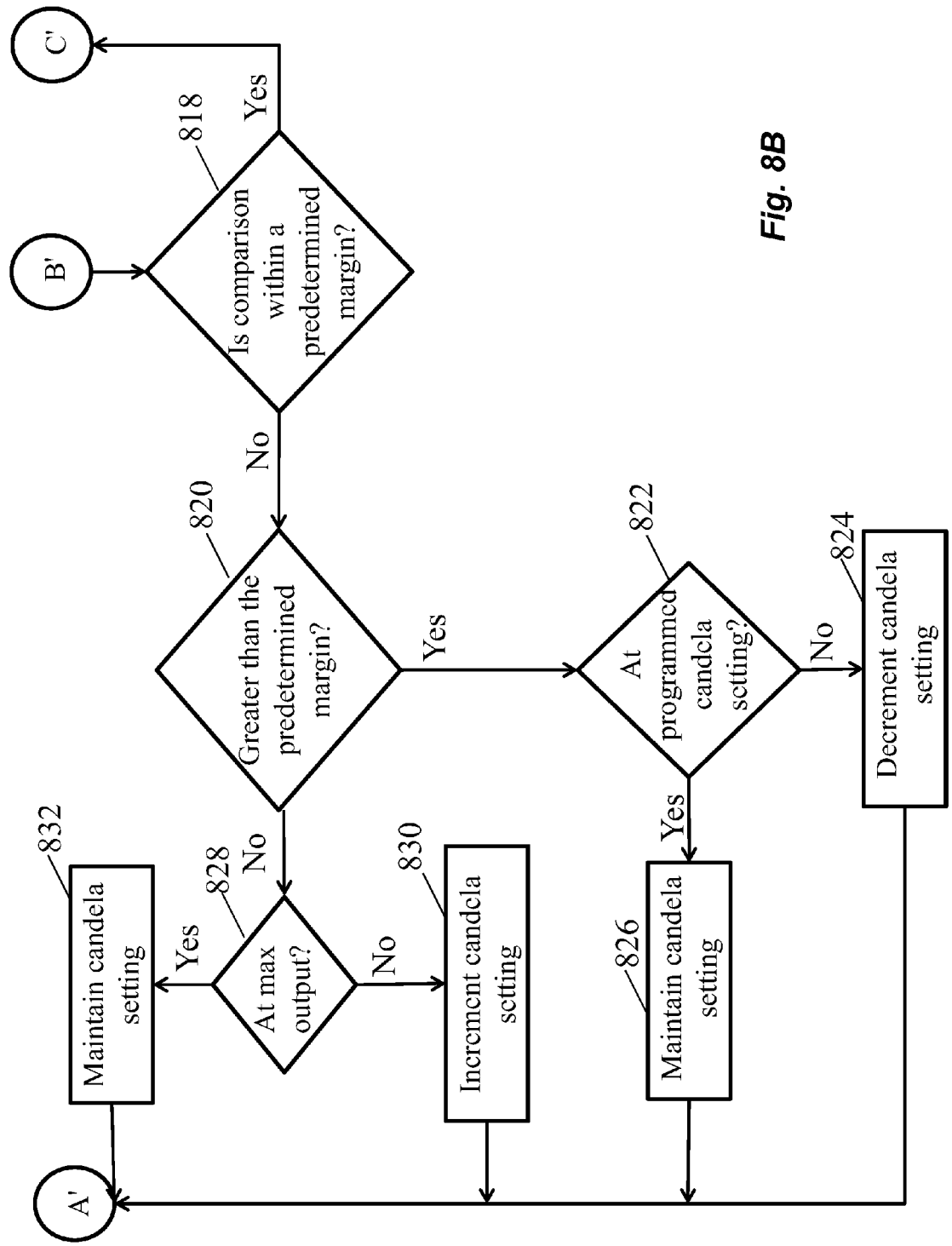

FIGS. 8A-B are an exemplary flow chart 800 of modifying the operation of the strobe notification appliance based on the environmental condition such that the output of the strobe notification appliance is at least at, or greater than, the programmed candela setting. An increase of 7-15% in illuminance may be optimal when indirectly detecting a light source, such as a strobe. In a more specific example, a 10% difference in illuminance of the flash from the ambient may be desirable. In that regard, in one embodiment, the strobe in the strobe notification appliance may be operated to maintain a fixed illuminance increase (or a range of a fixed illuminance increase) above the background lighting condition. This may make the strobe notification appliance more effective during a fire emergency if the background illuminance is being affected, such as by the fire conditions. The strobe may utilize a light sensor, such as visible spectrum light sensor 406 connected to an A/D converter 408 (illustrated in FIG. 4) to monitor the background illuminance when the strobe is off and to monitor the light output when the strobe is flashing. As discussed in more detail in FIGS. 8A-B, the strobe notification appliance may adjust the strobe output to maintain the desired increase in illuminance up to the maximum output of the strobe. The strobe may be configured for a minimum candela setting for a given room size (15, 30, 75, 110 candela etc.) and then be allowed to adjust upward to the strobes limit or downward to the programmed candela setting. Incrementing/decrementing the light may be done several ways, such as one (or a any combination of): varying PWM of the LED over a fixed flash time; different pulse widths; or varying the voltage or current.

At 802, the strobe of the strobe notification appliance is set to the programmed candela setting. At 804, it is determined whether the strobe is flashing, or between flashes/off. In response to determining that the strobe is not flashing, at 812, the ambient light is measured, and at 814, the measured value is saved.

In response to determining that the strobe is flashing, at 806, the flashing light is measured, at 808, the measured value is saved, and at 810, the measured value (either the measured value from 806 or the stored value from 808) is compared with the ambient light value (either the measured ambient light value from 812 or the saved measured ambient light value from 814). In one example, the comparison of the measurement with the light flashing with the measurement with the light not flashing (e.g., ambient) is a subtraction of the measurement with the light not flashing from the measurement with the light flashing. Another example of the comparison of the measurement with the light flashing with the measurement with the light not flashing is a percentage increase of the measurement with the light flashing over the measurement with the light not flashing.

At 818, it is determined whether the comparison is within a predetermined margin. As discussed above, an increase of 7-15% in illuminance may be optimal when indirectly detecting a light source. In this regard, the predetermined margin may be based on a percentage increase in illuminance from ambient. In response to determining that the comparison is within the predetermined margin, at 816, the current candela setting is maintained. In a first iteration of FIGS. 8A-B, the current candela setting is the programmed candela setting. In subsequent iterations, the candela setting may be incremented (see 830). In one embodiment, the increase in the candela setting may be fixed independent of the amount that the comparison is less than the predetermined margin. More specifically, in the event that the comparison is less than the predetermined margin, the candela setting may be increased to the next candela setting (e.g., if the current candela setting is 15 candela, and the next candela setting is 30 candela, the candela setting is incremented to 30 candela). In an alternate embodiment, the increase in the candela setting may be dependent on the amount that the comparison is less than the predetermined margin. More specifically, in the event that the comparison is less than the predetermined margin by a certain amount, the candela setting may be increased based on the certain amount (e.g., the candela setting may be incremented depending on how far from the comparison is from predetermined margin).

In response to determining that the comparison is outside of the predetermined margin, at 820, it is determined whether the comparison is greater than the predetermined margin. In other words, in one embodiment, it is determined whether the comparison is greater than a predetermined percentage (or a predetermined percentage range) greater than ambient. In one example, the predetermined percentage range comprises 7-15% greater than ambient. In this example, if the comparison is greater than 15% of ambient, then the candela setting may be decreased (but not be below the programmed candela setting). In another example, the predetermined percentage comprises 2% greater than ambient. In this example, if the comparison is greater than 2% of ambient, then the candela setting may be decreased (but not be below the programmed candela setting). Thus, in this instance, the illuminance from the strobe may be higher than necessary to notify an occupant. In this regard, the illuminance may be decreased. Thus, in response to determining that the comparison is greater than the predetermined margin, at 822, it is determined whether the current candela setting is at the programmed candela setting. If the current candela setting is at the programmed candela setting, at 826, the candela setting is maintained. As discussed above, the programmed candela setting is the minimum at which the strobe is to be operated. In this regard, even though the illuminance output from the strobe is greater than what is deemed necessary to notify an occupant of the building, the current candela setting is maintained so that the candela setting is not reduced below what is programmed. If the current candela setting is not at the programmed candela setting, at 824, the candela setting is decremented. In this instance, the illuminance output from the strobe is greater than what is deemed necessary to notify an occupant of the building and the candela setting of the strobe is higher than the programmed candela setting. Thus, the candela setting may be reduced so that the illuminance is within the predetermined margin.

If it is determined that the comparison is less than the predetermined margin, the flow diagram 800 proceeds to 828. In other words, in one embodiment, it is determined whether the comparison is less than 7-15% greater than ambient. In this instance, the illuminance from the strobe may be lower than necessary to notify an occupant. In this regard, the illuminance may be increased. At 828, it is determined whether the strobe is at its maximum output. If the strobe is at its maximum output, at 832, the current candela setting is maintained since the strobe is not configured for a greater output. In response to determining that the strobe is not at its maximum output, at 830, the candela setting is incremented. As one example, if the programmed candela setting is 15 candela, if the current candela setting is 15 candela, and if it is determined that the comparison is less than the predetermined margin, the candela setting may be increased to 30 candela. As another example, if the programmed candela setting is 15 candela, if the current candela setting is 30 candela, and if it is determined that the comparison is less than the predetermined margin, the candela setting may be increased to 70 candela.

FIG. 9 is an exemplary flow chart 900 of modifying the operation of the strobe notification appliance based on the environmental condition such that the output of the strobe notification appliance is equal to the programmed candela setting. As discussed above, the operation of the strobe in the strobe notification appliance may be modified based on the sensed environmental condition whilst still maintaining the programmed candela setting. At 902, the ambient light is sensed. At 904, the programmed candela setting is determined. At 906, a look-up table may be accessed, using as inputs the sensed ambient light and the programmed candela setting, and receiving as outputs the duration of the pulse and the drive current for the strobe. Alternatively, the look-up table may be accessed, using as inputs the sensed ambient light and the programmed candela setting, and receiving as an output the pulse width modulated (PWM) setting for the strobe. In another alternate embodiment, the look-up table may be accessed, using as inputs the sensed ambient light and the programmed candela setting, and receiving as outputs the pulse width modulated (PWM) setting and the drive current for the strobe (with the duration of the pulse remaining constant). A look-up table is one example of the construct to determine the one or more parameters of the strobe. Further, the sensed ambient light may be input directly to the look-up table. Alternatively, a range, in which the sensed ambient light is, may be determined, with the range being used as input to the look-up table. At 908, in response to receiving a command to activate the strobe, the duration/intensity from the look-up table is used to operate the strobe to generate an output at the programmed candela intensity.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A strobe notification device for use in an alarm system, the strobe notification device comprising:
   a communication interface;
   a strobe element; and
   a controller in communication with the communication interface and the strobe element, the controller configured to:
   determine a candela setting programmed for the strobe notification device, the programmed candela setting selected from a plurality of available candela settings;
   receive one or more signals indicative of a parameter pertaining to an environmental condition;
   select, based on the one or more signals indicative of the parameter pertaining to the environmental condition and from a plurality of pulse durations, a duration of a pulse of the strobe element such that the strobe element operates at least at the programmed candela setting;
   receive, via the communication interface, a command to activate the strobe element; and
   in response to receiving the command, use the selected duration of the pulse in order to control the strobe element to operate the strobe element at least at the programmed candela setting.

2. The strobe notification device of claim 1, further comprising a sensor, the sensor in communication with the controller and configured to generate the one or more signals indicative of a parameter pertaining to the environmental condition.

3. The strobe notification device of claim 2, wherein the controller is further configured to select, based on the one or more signals indicative of the parameter pertaining to the environmental condition, an intensity of the pulse to generate an output by the strobe element equal to the programmed candela setting; and
   wherein the controller is configured to control the strobe element at the intensity and the duration of the pulse to equal the programmed candela setting.

4. The strobe notification device of claim 3, wherein the sensor is configured to sense an indication of ambient light; and
   wherein the controller is configured to select the intensity and the duration of the pulse, from a plurality of intensities and the plurality of pulse durations, based on the indication of ambient light and the programmed candela setting.

5. The strobe notification device of claim 4, wherein the controller is configured to select the intensity and the duration of a pulse by:
   comparing the indication of ambient light with at least one threshold; and
   accessing a look-up table using as inputs the programmed candela setting and the comparison of the indication of ambient light with at least one threshold.

6. The strobe notification device of claim 5, wherein the controller is further configured to receive, from a fire alarm panel, the look-up table.

7. The strobe notification device of claim 3, wherein the parameter pertaining to the environmental condition comprises a parameter pertaining to ambient light; and
   wherein the controller is configured to select the intensity and the duration of a pulse by:
   comparing the parameter pertaining to ambient light with a threshold;
   in response to the parameter pertaining to ambient light being greater than the threshold, selecting a first drive current and a first duration;
   in response to the parameter pertaining to ambient light being less than the threshold, selecting a second drive current and a second duration;
   wherein the first drive current is greater than the second drive current;
   wherein the first duration is shorter than the second duration;
   wherein the strobe element driven at the first drive current for the first duration equals the programmed candela setting; and
   wherein the strobe element driven at the second drive current for the second duration equals the programmed candela setting.

8. The strobe notification device of claim 1, further comprising a multi-position switch, the multi-position switch in communication with the controller; and
   wherein the controller is configured to determine the programmed candela setting for the strobe notification device by communicating with the multi-position switch to determine its setting.

9. The strobe notification device of claim 8, wherein the controller is configured to select the duration of the pulse to generate an output by the strobe element which is greater than the programmed candela setting; and
   wherein the controller is configured to use the selected duration of the pulse to provide an output which is greater than the programmed candela setting.

10. The strobe notification device of claim 9, wherein the controller is configured to select, based on the one or more signals indicative of the parameter pertaining to the environmental condition, an environmental candela setting, the environmental candela setting being greater than the programmed candela setting and selected from a discrete set of available candela settings; and wherein the controller is configured to control the strobe element for an intensity and the duration of the pulse to provide the output which is greater than the programmed candela setting by controlling the strobe element to operate at the environmental candela setting.

11. The strobe notification device of claim 10, wherein the controller is configured to select the environmental candela setting by:

receiving a measurement of ambient light when the strobe is not flashing;

receiving a measurement of ambient light when the strobe is flashing;

determining a difference between the measurement of the ambient light when the strobe is flashing and the measurement of the ambient light when the strobe is not flashing;

determining whether the difference is less than a predetermined value; and in response to determining that the difference is less than the predetermined value, selecting the environmental candela setting to be greater than the programmed candela setting.

12. The strobe notification device of claim 11, wherein the controller is configured to select the environmental candela setting further by:

in response to determining that the difference is greater than the predetermined value, reduce a current candela setting so that the environmental candela setting is no more than the programmed candela setting.

13. A method for operating a strobe notification device used in an alarm system, the method comprising:

determining a candela setting programmed for the strobe notification device, the programmed candela setting selected from a plurality of available candela settings;

receiving one or more signals indicative of a parameter pertaining to an environmental condition;

selecting, based on the one or more signals indicative of the parameter pertaining to the environmental condition and from a plurality of pulse durations, a duration of a pulse of a strobe element such that the strobe element operates at least at the programmed candela setting;

receiving, via a communication interface, a command to activate the strobe element; and in response to receiving the command, using the selected duration of the pulse in order to control the strobe element to operate the strobe element at least at the programmed candela setting.

14. The method of claim 13, further comprising selecting, based on the one or more signals indicative of the parameter pertaining to the environmental condition, an intensity of the pulse to generate an output by the strobe element which is equal to the programmed candela setting; and wherein using the selected duration of the pulse comprises controlling the strobe element for the intensity and the duration of the pulse to provide an output which is equal to the programmed candela setting.

15. The method of claim 14, wherein the parameter pertaining to the environmental condition comprises a parameter pertaining to ambient light; and wherein selecting the intensity and the duration of the pulse comprises:

comparing the parameter pertaining to ambient light with a threshold;

in response to the parameter pertaining to ambient light being greater than the threshold, selecting a first drive current and a first duration;

in response to the parameter pertaining to ambient light being less than the threshold, selecting a second drive current and a second duration;

wherein the first drive current is greater than the second drive current;

wherein the first duration is shorter than the second duration;

wherein the strobe element driven at the first drive current for the first duration equals the programmed candela setting; and wherein the strobe element driven at the second drive current for the second duration equals the programmed candela setting.

16. The method of claim 13, wherein selecting at least one aspect of operation of the strobe element comprises selecting, based on the one or more signals indicative of a parameter pertaining to the environmental condition, the duration of the pulse to generate an output by the strobe element to be greater than the programmed candela setting; and wherein using the selected duration of the pulse provides an output which is greater than the programmed candela setting.

17. A strobe notification device for use in an alarm system, the strobe notification device comprising:

a communication interface;

a sensor;

a strobe element; and a controller in communication with the communication interface, the sensor, and the strobe element, the controller configured to:

determine whether the strobe element is generating an output;

in response to determining that the strobe element is generating the output, save one or more signals received from the sensor, the one or more signals indicative of a parameter pertaining to the environmental condition;

select, based on the one or more signals indicative of the parameter pertaining to the environmental condition, at least one aspect of operation of the strobe element;

receive, via the communication interface, a command to activate the strobe element; and in response to receiving the command, using the selected at least one aspect in order to control the strobe element.

18. The strobe notification device of claim 17, wherein the controller is configured to determine whether the strobe element is generating the output by determining whether the controller is sending a control signal to the strobe element to generate a flash.

19. The strobe notification device of claim 17, wherein the controller is further configured to, in response to determining that the strobe element is not generating the output, save the one or more signals indicative of the parameter pertaining to the environmental condition sent from the sensor.

20. The strobe notification device of claim 19, wherein the controller is configured to select, based on the one or more signals indicative of the parameter pertaining to the environmental condition, at least one aspect of operation of the strobe element by:

comparing the one or more signals indicative of the parameter pertaining to the environmental condition sent from the sensor when the strobe element is flashing with the one or more signals indicative of the parameter pertaining to the environmental condition sent from the sensor when the strobe element is not flashing.

21. A method for operating a strobe notification device used in an alarm system, the method comprising:

determining whether a strobe element of the strobe notification device is generating an output;

in response to determining that the strobe element is generating the output, saving one or more signals indicative of a parameter pertaining to the environmental condition sent from a sensor;

selecting, based on the one or more signals indicative of the parameter pertaining to the environmental condition, at least one aspect of operation of the strobe element;

receiving, via a communication interface, a command to activate the strobe element; and in response to receiving the command, using the selected at least one aspect in order to control the strobe element.

\* \* \* \* \*